United States Patent
Gohara et al.

(10) Patent No.: US 9,712,089 B2
(45) Date of Patent: Jul. 18, 2017

(54) FAN MOTOR DRIVING MEANS, DRIVING METHOD, AND COOLING DEVICE AND ELECTRONIC EQUIPMENT USING THE SAME

(71) Applicant: ROHM CO., LTD., Ukyo-Ku, Kyoto (JP)

(72) Inventors: Yuki Gohara, Kyoto (JP); Tomofumi Mishima, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 14/882,932

(22) Filed: Oct. 14, 2015

(65) Prior Publication Data

US 2016/0111989 A1   Apr. 21, 2016

(30) Foreign Application Priority Data

Oct. 17, 2014   (JP) .................. 2014-212983

(51) Int. Cl.
| | |
|---|---|
| H02P 6/14 | (2016.01) |
| H02P 3/22 | (2006.01) |
| H02P 6/00 | (2016.01) |
| H02K 11/00 | (2016.01) |
| H02P 3/12 | (2006.01) |
| H02P 6/15 | (2016.01) |

(52) U.S. Cl.
CPC ............ H02P 3/22 (2013.01); H02K 11/0021 (2013.01); H02P 3/12 (2013.01); H02P 6/001 (2013.01); H02P 6/008 (2013.01); H02P 6/15 (2016.02)

(58) Field of Classification Search
CPC ........................................................ H02P 6/14
USPC .................................................. 318/490, 504
See application file for complete search history.

(56) References Cited

U.S. PATENT DOCUMENTS

| | | | |
|---|---|---|---|
| 7,786,688 B2 * | 8/2010 | Hayashi ............... | H02P 7/29 318/400.26 |
| 7,889,977 B2 * | 2/2011 | Strike .................. | H02P 7/29 318/400.21 |

FOREIGN PATENT DOCUMENTS

JP   2007159296 A   6/2007

* cited by examiner

*Primary Examiner* — David S Luo
(74) *Attorney, Agent, or Firm* — Cantor Colburn LLP

(57) ABSTRACT

The present invention inhibits the voltage jump of a source voltage or an output voltage by an approach which is different from a conventional one. A logic circuit allows an H bridge circuit to be shifted among a plurality of states in a specific sequence. A compulsory regenerating circuit is configured to be switched between an enabled state and a disabled state; while being in the enabled state, the current that flows in from a ground line via the H bridge circuit and a motor coil to a power line back-flows to the ground line.

25 Claims, 12 Drawing Sheets

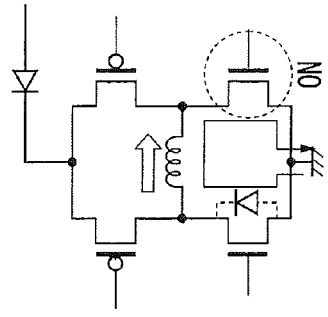
FIG. 4A φ1
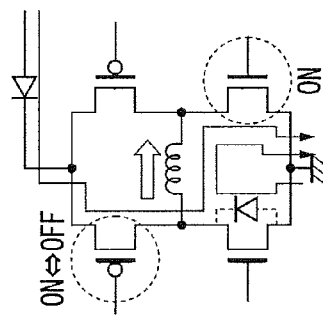
FIG. 4B φ2(φ10)
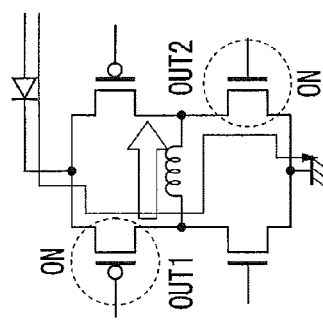
FIG. 4C φ3(φ9)
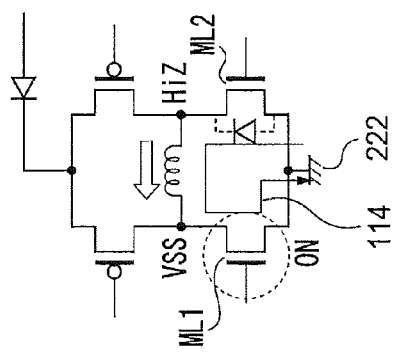
FIG. 4D φ4(φ8)
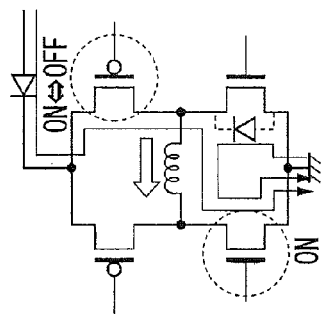
FIG. 4E φ5(φ7)
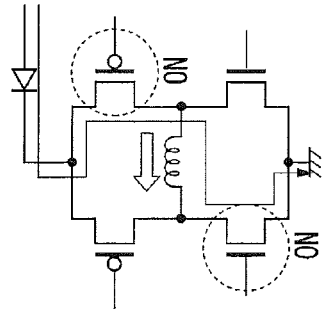
FIG. 4F φ6

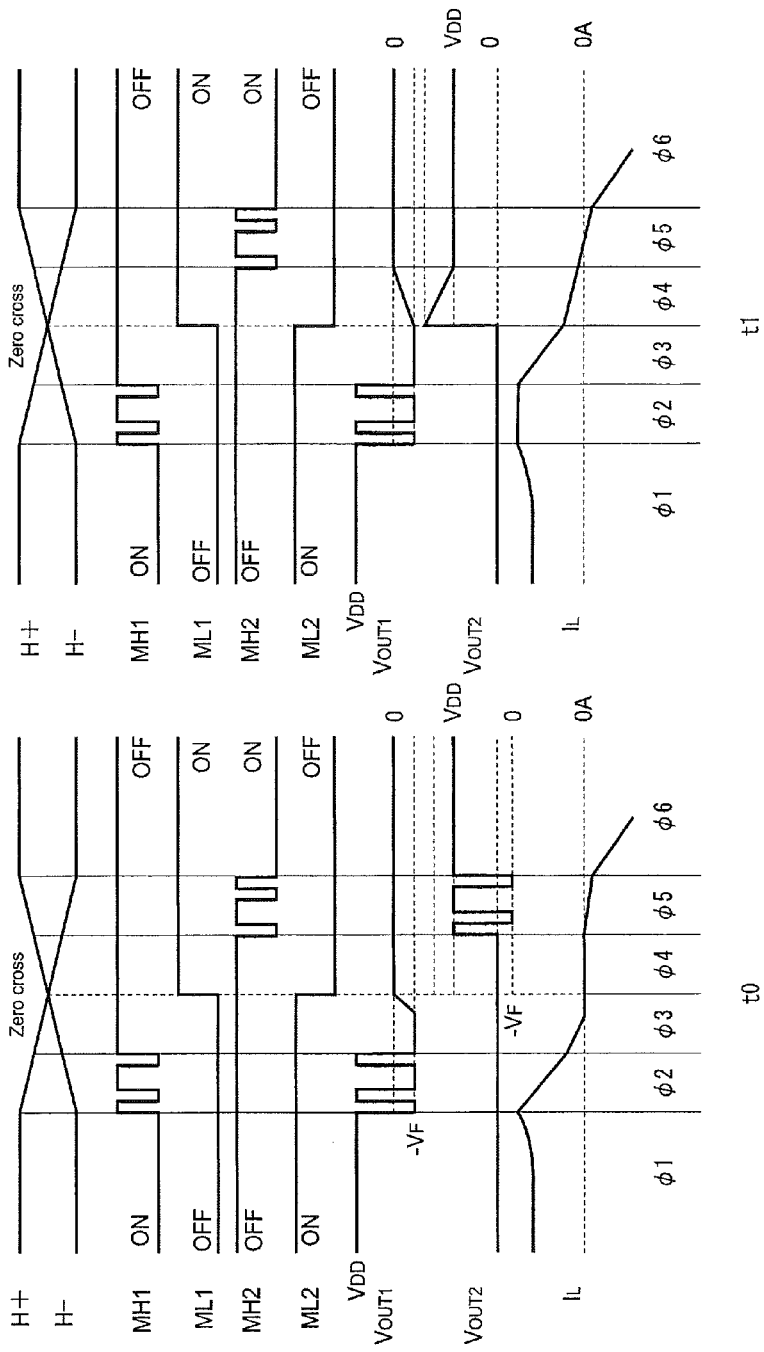

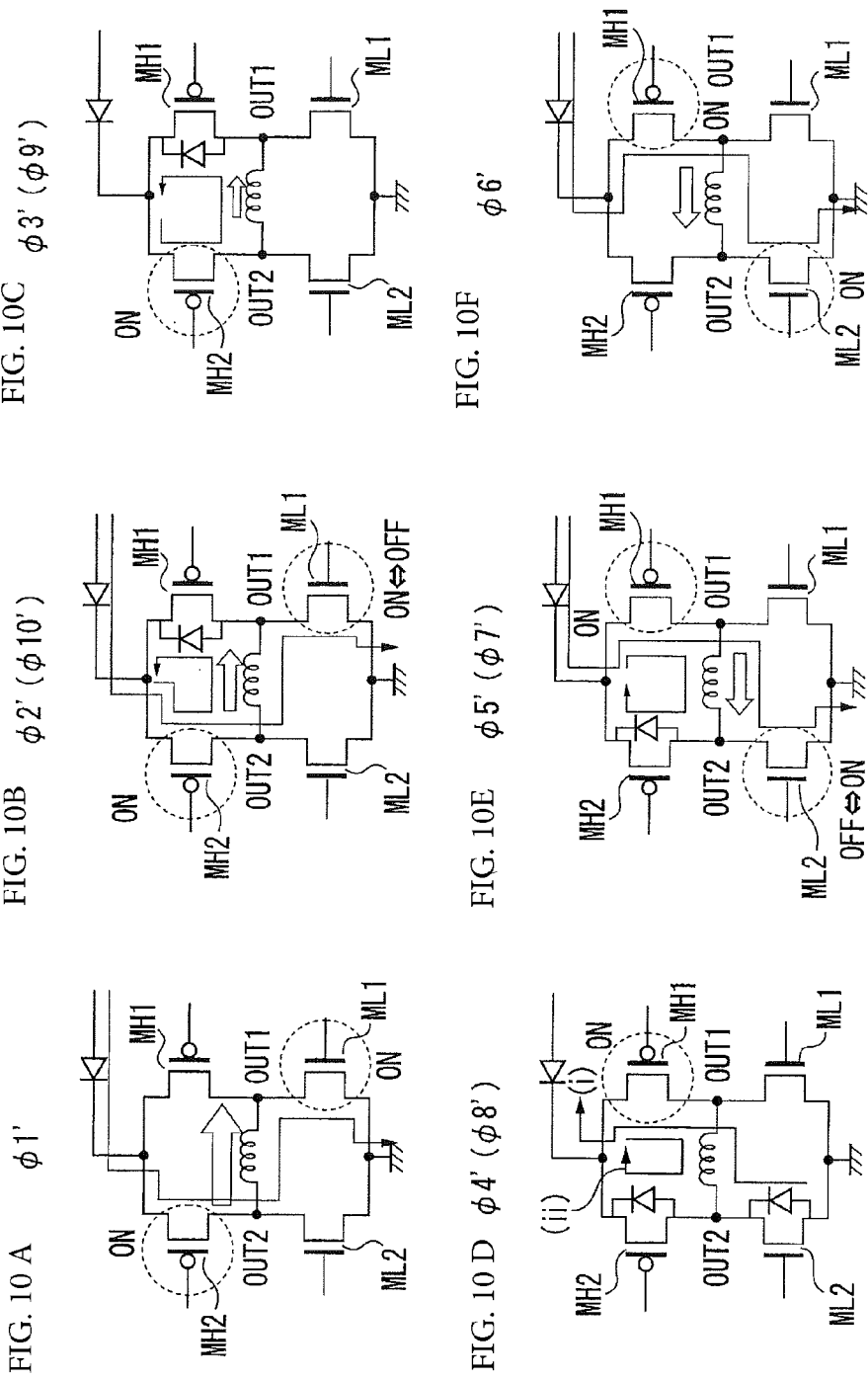

FAN MOTOR DRIVING MEANS, DRIVING METHOD, AND COOLING DEVICE AND ELECTRONIC EQUIPMENT USING THE SAME

CROSS REFERENCE TO RELATED APPLICATIONS

The present invention claims priority under 35 U.S.C. §119 to Japanese Application No. 2014-212983 filed Oct. 17, 2014, the entire content of which is incorporated herein by reference.

BACKGROUND

In recent years, with the aim of speeding up the personal computers or work stations, the operating speed of large scale integrated circuits (LSIs) for use in calculation processing, such as central processing units (CPUs) and digital signal processors (DSPs) continues to increase. The heat generated by such LSIs also increases with the increase in the operating speed (that is, the increase in clock frequency) thereof. The heat generated from the LSI causes the thermal runaway of the LSI itself or affects the peripheral circuits. Therefore, the appropriate cooling down of the heat generators such as the LSI (hereinafter, LSI, collectively) becomes a critical technology. As one example of the technology for cooling down the LSI, an air-cooled method using the cooling fan has been proposed. This method employs, for example, the cooling fan that is disposed opposite to the surface of the LSI so as to blow cool air to the surface of the LSI.

FIG. 1A and FIG. 1B are circuit diagrams illustrating a portion of the fan motor driving device 200r. The output section of the motor driving device comprises an H bridge circuit 206 that is coupled with the motor coil 103 of the driving subject. Regarding the H bridge circuit 206, if it is connected with an external power 106 with the reversed polarity, a high-current may flow therein. To prevent this situation, a reverse connection prevention diode 212 is inserted between the H bridge circuit 206 and the power connector $V_{DD}$.

In the above-mentioned scenario, it is concerned that the current may flow through the path 112 (comprising the low-voltage side transistor ML1, the motor coil 103, and the body diode DH2 of the high-voltage side transistor) to the external power source 106 based on the phase relationship between the coil current $I_L$ and the output voltage $V_{OUT}$, thereby causing a significant voltage jumping of the output voltage $V_{OUT2}$ or the source voltage $V_{DD}$. To solve this problem, the prior technology must insert a Zener diode 108 or smoothing capacitor 110 in parallel connection with the H bridge circuit 206.

PRIOR TECHNICAL LITERATURE

Patent Literature

[Patent literature 1] Japanese patent laid-open publication No. 2007-159296.

BRIEF SUMMARY OF THE INVENTION

Problems to be Solved in the Present Invention

Regarding the problems discussed in the Background, to sufficiently inhibit the voltage jump of the voltage, a high-performance Zener diode 108 or a high-volume smoothing capacitor 110 must be used, thereby causing the increase in the cost. In the case where the Zener diode 108 or the smoothing capacitor 110 is externally installed on the semiconductor integrated circuit (IC), there also exit problems such as the increase of circuit area and increase in the number of the elements, and the increase of the cost.

The present invention aims to solve the problem faced the prior art, and one purpose of the present invention is to provide a motor driving device capable of inhibiting the voltage jump of the source voltage or the output voltage by an approach which is different from a conventional one.

Technical Means for Solving Problems

One aspect of the present invention is directed to a motor driving device for driving a single-phase motor. The motor driving device comprises: an H bridge circuit, configured to receive a source voltage and a ground voltage, and couple to the motor coil of the single-phase motor between a first output and a second output thereof; a logic circuit, configured to allow the H bridge circuit to be shifted among a plurality of states in a specific sequence; and a compulsory regenerating circuit, configured to be switched between an enabled state and a disabled state, and while being in the enabled state, allow a current flowing from the ground line via the H bridge circuit and the motor coil to a power line to back-flow to the ground line.

According to the above-mentioned aspect, it is feasible to allow the current that is intended to flow to the power source through the reverse connection prevention diode to back-flow to the ground line, thereby inhibiting the voltage jump of the source voltage or the output voltage.

Also, the plurality of states comprises first state in which the first output is the ground voltage, and the second output is in a high-impedance state. Alternatively, the logic circuit enables the compulsory regenerating circuit when the logic circuit is in the first state, and when the motor coil has a current flowing in a direction from the first output via the motor coil and toward the second output.

In this way, in the control sequence of using the low-voltage side transistor pair of H bridge circuit to form the current loop, it is feasible to inhibit the voltage jump of the source voltage or the output voltage caused by the delay of the phase of the coil current in relative to the output voltage of the H bridge circuit.

Still optionally, the logic circuit allows the second output to be switched between the high-impedance state and the ground voltage during the period in which the compulsory regenerating circuit is in the enabled state.

In the above-mentioned scenario, when the second output is in the high-impedance state interval, it is possible to consume the energy of the motor coil using the compulsory regenerating circuit. Further, by incorporating the interval in which the second output is set as the ground voltage, it is possible to further inhibit the voltage jump of the voltage, as compared with the case where the second output is kept in the high-impedance state. Furthermore, the balance between the power consumed by the compulsory regenerating circuit and the jump level of the voltage can be adjusted based on the duty ratio of the switching.

Also optionally, the plurality of states further comprises a second state in which the second output is the ground voltage and the first output is in the high-impedance state. Still optionally, the logic circuit enables the compulsory regenerating circuit, when the logic circuit is in the second state and the motor coil has the coil current flowing in a direction from the second output toward the first output.

Also, the plurality of states comprises a third state in which the first output is the source voltage and the second output is in the high-impedance state. Optionally, the logic circuit enables the compulsory regenerating circuit when the logic circuit it in the third state and the motor coil has the coil current flowing in a direction from the second output toward the first output.

Also, the plurality of states comprises a fourth state in which the second output is the source voltage and the first output is in the high-impedance state. Still optionally, the logic circuit enables the compulsory regenerating circuit when the logic circuit is in the fourth state and the motor coil has the coil current flowing in a direction from the first output toward the second output.

According to the above-mentioned features, in the control sequence of using the high-voltage side transistor pair of H bridge circuit to form the current loop, it is feasible to inhibit the voltage jump of the source voltage or the output voltage caused by the delay of the phase of the coil current in relative to the output voltage of the H bridge circuit.

The driving device according to one aspect may further comprise a current monitoring circuit that detects the direction or phase of the coil current flowing in the motor coil. Optionally, the logic circuit controls the compulsory regenerating circuit based on the output of the current monitoring circuit.

Still optionally, the current monitoring circuit comprises a first comparator for comparing the voltage of the first output and a first threshold voltage. Optionally, the logic circuit controls the compulsory regenerating circuit based on the output of the first comparator.

By monitoring the voltage of the first output, it is feasible to detect the direction or phase of the coil current.

Optionally, the first threshold voltage is set as the ground voltage or a neighboring value. The logic circuit enables the compulsory regenerating circuit when the voltage of the first output is lower than the first threshold voltage.

Optionally, the current monitoring circuit further comprises a second comparator for comparing the voltage of the second output and a second threshold voltage. Optionally, the logic circuit controls the compulsory regenerating circuit based on the output of the second comparator.

By monitoring the voltage of the second output, it is feasible to detect that the coil current has been substantially reduced.

Optionally, the second threshold voltage is set as a value between the ground voltage and the source voltage. Optionally, the logic circuit disables the compulsory regenerating circuit when the voltage of the second output is lower than the second threshold voltage. Optionally, the second threshold voltage is set as the average of the ground voltage and the source voltage.

Optionally, the logic circuit disables the compulsory regenerating circuit, when the compulsory regenerating circuit is in the enabled state period, and when the coil current flowing in the motor coil is reduced to a specific amount.

Optionally, the logic circuit disables the compulsory regenerating circuit, after the compulsory regenerating circuit has been switched into the enabled state for a specific period.

Optionally, the compulsory regenerating circuit comprises a transistor disposed between the power line and the ground line. By conducting the transistor, a path for the back-flow of the current from the power line to the ground line is formed.

Optionally, the compulsory regenerating circuit further comprises a resistor that is disposed between the power line and the ground line and in series connection with the transistor. In this example, it is feasible to set the consumption speed of the energy stored in the coil based on the resistance of the transistor.

Optionally, the compulsory regenerating circuit further comprises a diode disposed between the power line and the ground line and in series connection with the transistor. In this example, it is feasible to consume the speed of the energy stored in the coil.

The H bridge circuit and the compulsory regenerating circuit may share a common portion.

The logic circuit is configured to be sequentially shifted into at least the following states: (i) a first conducting state, in which the first output is set as the source voltage, and the second output is set as the ground voltage; (ii) a first regenerating state, in which the first output is set as the high-impedance state, and the second output is set as the ground voltage; (iii) a second regenerating state, in which the first output is set as the ground voltage, and the second output is set as the high-impedance state; (iv) a second conducting state, in which the first output is set as the ground voltage, and the second output is set as the source voltage; (v) a third regenerating state, in which the first output is set as the high-impedance state, and the second output is set as the ground voltage; and (vi) a fourth regenerating state, in which the first output is set as the ground voltage, and the second output is set as the high-impedance state. Optionally, the logic circuit (a) enables the compulsory regenerating circuit, when the logic circuit is in the second regenerating state and has a current flowing in a direction from the first output via the motor coil and toward the second output. Still optionally, the logic circuit (b) enables the compulsory regenerating circuit, when the logic circuit is in the fourth regenerating state and has a current flowing in a direction from the second output via the motor coil and toward the first output.

Further, another aspect of the present invention is also directed to a motor driving device. The motor driving device comprises an H bridge circuit, a logic circuit, a compulsory regenerating circuit, a first comparator for comparing the voltage of the first output and a first threshold voltage, and a second comparator, for comparing the voltage of the second output and a second threshold voltage. The logic circuit is configured to be sequentially shifted into at least the following states: (i) a first conducting state, in which the first output is set as the source voltage, and the second output is set as the ground voltage; (ii) a first regenerating state, in which the first output is set as the high-impedance state, and the second output is set as the ground voltage; (iii) a second regenerating state, in which the first output is set as the ground voltage, and the second output is set as the high-impedance state; (iv) a second conducting state, in which the first output is set as the ground voltage, and the second output is set as the source voltage; (v) a third regenerating state, in which the first output is set as the ground voltage, and the second output is set as the high-impedance state; and (vi) a fourth regenerating state, in which the first output is set as the high-impedance state, and the second output is set as the ground voltage. Optionally, the compulsory regenerating circuit, (a) while being in the second regenerating state, becomes into the enabled state based on the output of the first comparator, and becomes into the disabled state based on the output of the second comparator; (b) while being in the fourth regenerating state, becomes into the enabled state based on the output of the second comparator, and becomes into the disabled state based on to output of the first comparator.

According to the above-mentioned aspect, it is feasible to allow the current that is intended to flow to the power source through the reverse connection prevention diode to backflow to the ground line, thereby inhibiting the voltage jump of the source voltage or the output voltage.

The impedance of the compulsory regenerating circuit in the enabled state may also be higher than the impedance of the current path of the H bridge circuit.

Optionally, the motor driving device is integrated on a semiconductor substrate as a whole.

The phrase "integrated as a whole" comprise the case in which all elements of circuit are formed on the semiconductor substrate, or the case in which the main elements are integrated as a whole; still optionally, some resistors or capacitors may be disposed externally to the semiconductor substrate, in order to adjust the circuit constant.

By integrating the circuit on one chip, it is feasible to reduce the area of the circuit, and maintain the uniformness of the characteristics across the circuit elements.

Another aspect of the present invention is directed to a cooling device. The cooling device may comprise: a fan motor; a Hall element, configured to generate a pair of Hall signals indicating the position of the rotor of the fan motor; and the motor driving device according to any one of the above-mentioned examples, in which the motor driving device is configured to drive the fan motor based on the pair of Hall signals.

Another aspect of the present invention is directed to an electronic equipment. The electronic equipment may comprise: a processor; a fan motor, disposed opposite to the processor; a Hall element, configured to generate a pair of Hall signals indicating the position of the rotor of the fan motor; and the motor driving device according to any one of the above-mentioned examples, in which the motor driving device is configured to drive the fan motor based on the pair of Hall signals.

Further, effective aspects of present invention also comprise any combinations of the above-mentioned constituting elements; alternatively, effective aspects of present invention also comprise the substitution among the constituting elements of the present invention and their applications in methods, device, systems, etc.

Effects of the Present Invention

According to one aspect of the present invention, it is feasible to inhibit the voltage jump of the source voltage or the output voltage.

BRIEF DESCRIPTION OF THE DRAWINGS

FIGS. 4A to 4F provide state transition diagrams of the H bridge circuit of the motor driving device in the prior art.

FIGS. 5A and 5B provide operation waveform diagrams of the motor driving device in the prior art.

FIGS. 10A to 10F provides state transition diagrams of the H bridge circuit of the motor driving device according to a second variant example.

DETAILED DESCRIPTION

The present invention is described hereinbelow based on preferred embodiments thereof by referencing to the appended drawings. Like or equivalent constituting elements, components and processes across various drawings are designated with the same or similar reference symbols, and repeated description thereof may be omitted where suitable. Also, the embodiments are provided for illustrative purposes and should not be construed to limit the scope of the claimed invention, while not all the features or combinations thereof are necessarily the essence of the claimed invention.

In this specification, the description regarding the status that "a component A is connected with/to a component B" includes not only the physical and direct connection between the component A and the component B, but also the indirect connection between the component A and the component B; as long as such indirect connection does not substantially affect the electric connection status therebetween or the functionality attained by such connection.

Similarly, the description regarding the status that "a component C is disposed between a component A and a component B" includes not only the physical and direct connection between the component A and the component C or between the component B and the component C, but also the indirect connection therebetween; as long as such indirect connection does not substantially affect the electric connection status therebetween or the functionality attained by such connection.

The fan motor driving device (also abbreviated as "driving device") installed in computers, such as the personal computer or work station, for driving the fan motor for cooling the CPU or the like are used as an example to discuss the embodiments of the present invention.

Figure 2:
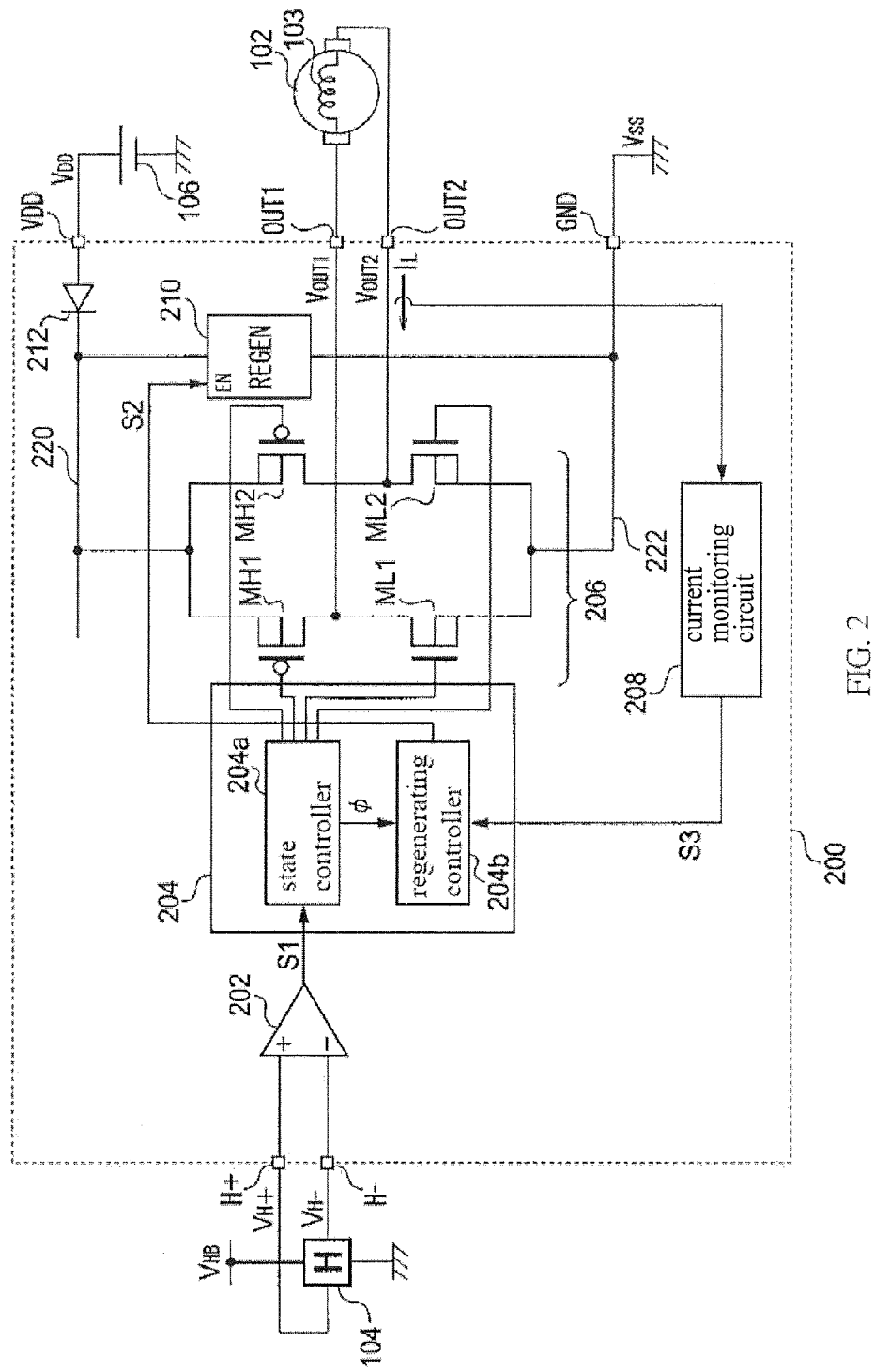
FIG. 2 is a circuit diagram of is a motor driving device according to embodiments of the present disclosure.

FIG. 2 is a circuit diagram illustrating a motor driving device 200 according to embodiments of the present disclosure. The driving device 2 drives the single-phase direct current (DC) motor (also abbreviated as "motor" or "single-phase motor") 102. The Hall element 104 is disposed in adjacent to the single-phase motor 102. The Hall element 104 is configured to generate a pair of Hall signals $V_{H+}$, $V_{H-}$ that are mutually reverse in phase for representing the position of the rotor of the motor 102. A Hall bias voltage $V_{HB}$ is applied to the bias terminal of the Hall element 104. The Hall bias voltage $V_{HB}$ may be generated by a reference voltage source (Hall bias circuit) disposed in the motor driving device 200; or it could be generated by the divided voltage of the source voltage $V_{DD}$ generated by the external power source 106. The Hall element 104 can also be disposed within the motor driving device 200.

The motor driving device 200 comprises a Hall comparator 202, a logic circuit 204, an H bridge circuit 206, a current monitoring circuit 208, a compulsory regenerating circuit 210, and a reverse connection prevention diode 212, being integrated on a semiconductor substrate as a whole. The phrase "integrated as a whole" comprise the case in which all elements of circuit are formed on the semiconductor substrate, or the case in which the main elements are integrated as a whole; still optionally, some resistors or capacitors may be disposed externally to the semiconductor substrate, in order to adjust the circuit constant.

A source voltage $V_{DD}$ from the external power source 106 is applied to the power source terminal (VDD) of the motor driving device 200. The coil (motor coil) 103 of the single-phase motor 102 is connected between the output terminals (OUT1, OUT2) of the motor driving device 200. The ground terminal (GND) is connected to the ground. Hall signals $V_{H+}$, $V_{H-}$ generated by the Hall element 104 is inputted to the Hall terminals H+, H−.

The Hall comparator 202 compares the Hall signals $V_{H+}$, $V_{H-}$ and generates the Hall detection signal S1 that indicates the position of the rotor of the single-phase motor 102. The Hall detection signal S1 shifts when the Hall signals $V_{H+}$, $V_{H-}$ cross (zero crossing) each other.

The H bridge circuit 206 receives the source voltage $V_{DD}$ and the ground voltage $V_{SS}$. The motor coil 103 of the single-phase motor 102 is connected between the first output OUT1 and the second output OUT2 of the H bridge circuit 206. The H bridge circuit 206 comprises a first high-voltage side transistor MH1, a second high-voltage side transistor MH2, a first low-voltage side transistor ML1, and a second low-voltage side transistor ML2. A reverse connection prevention diode 212 is disposed between the H bridge circuit 206 and the external power source 106.

The H bridge circuit 206 may be in a plurality states depending on the different combinations of the ON or the OFF states of four transistors. The functional block (state controller) 204a comprised in the logic circuit 204 allows the H bridge circuit 206 to be shifted among the plurality of states (hereinafter, φ1 to φ10) in a specific sequence. For example, the state controller 204a may allow the transition of the plurality of states synchronously with the Hall detection signal S1, and there is no particular limitation as to controlling way.

The compulsory regenerating circuit 210 is configured to be switched into the enabled (ON, active) or the disabled (OFF, inactive) state. The compulsory regenerating circuit 210, while being in the enabled state, allows the current flowing from the ground line 222 via the H bridge circuit 206 and the motor coil 103 toward a power line 220 to back-flow to the ground line 222. The state of the compulsory regenerating circuit 210 is switched depending on the enabling signal S2 generated by the functional block (regenerating controller) comprised in the logic circuit 204.

Figure 3A:
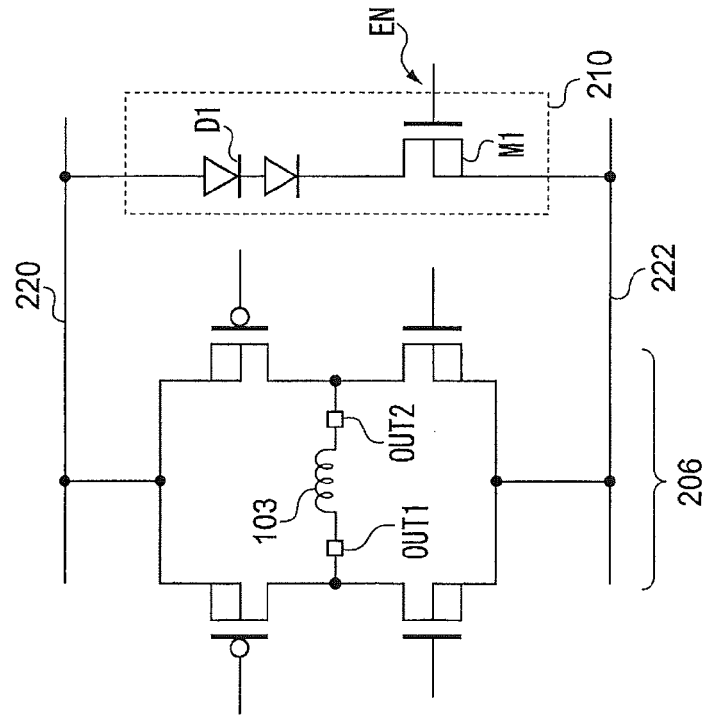
FIGS. 3A and 3B provide 3 circuit diagrams of the compulsory regenerating circuit, according to some examples.
Figure 3B:
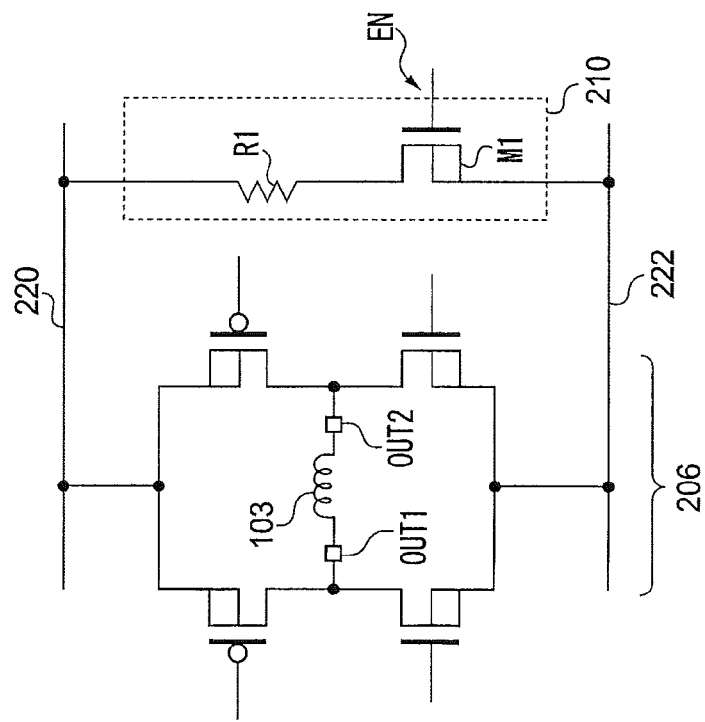

FIGS. 3A and 3B provide circuit diagrams of the compulsory regenerating circuit 210, according to some examples. The compulsory regenerating circuit 210 comprises a transistor M1 disposed between the power line 220 and the ground line 222. The impedance of the current path of the compulsory regenerating circuit 210 is, preferably, higher than the impedance of the current path of the H bridge circuit 206. The compulsory regenerating circuit 210 illustrated in FIG. 3A comprises a resistor R1 that is in series connection with the transistor M1. The compulsory regenerating circuit 210 illustrated in FIG. 3B comprises a diode D1 that is in series connection with the transistor M1. During the period in which the coil current is recharged using the compulsory regenerating circuit 210, the resistor R1 or the diode D1 us used to dissipate the energy. The resistor R1 or diode D1 may also be disposed in combination. Alternatively, the impedance (ON resistance) of the transistor M1 may be designed to be high enough so as to replace the use of the resistor R1 or the diode D1.

Returning to FIG. 2, the control of the compulsory regenerating circuit 210 is described. The plurality of states (hereinafter, φ1 to φ10) of the H bridge circuit 206 comprise a first state (hereinafter, φ4) in which the first output OUT1 is the ground voltage $V_{SS}$, and the second output OUT2 is in the high_impedance state.

The current monitoring circuit 208 is disposed so that it is configured to detect the direction of the coil current $I_L$ or the phase relation of the voltage $V_{OUT}$ that the coil current $I_L$ applied on the motor coil 103. During the period of the first state φ4, the regenerating controller 204b of the logic circuit 204 controls the compulsory regenerating circuit 210 based on the output S3 of the current monitoring circuit 208.

(1) Specifically, when the regenerating controller 204b is in the first state φ4, and when the motor coil 103 has the coil current $I_L$ that flows in the direction from the first output OUT1 toward the second output OUT2, the regenerating controller 204b enables the compulsory regenerating circuit 210.

(2-a) Also, when the regenerating controller 204b is in the first state φ4, it can also keep the compulsory regenerating circuit 210 in the enabled state.

(2-b) Alternatively, when the regenerating controller 204b is in the first state φ4, and when the concern regarding the voltage jump no longer exists, the regenerating controller 204b disables the compulsory regenerating circuit 210. For example, (i) during a specific period τ after the H bridge circuit 206 is shifted into the regenerating state φ4, the regenerating controller 204b may set the compulsory regenerating circuit 210 to be in the enabled state, and after the expiration of the specific period τ, the regenerating controller 204b disables the compulsory regenerating circuit 210. The specific period τ may be determined experimentally or by simulation. (ii) Alternatively, the regenerating controller 204b may also monitor the coil current $I_L$, when the coil current $I_L$ flowing from the first output OUT1 toward the second output OUT2 reduces sufficiently, the regenerating controller 204b disables the compulsory regenerating circuit 210. The regenerating controller 204b may also combine the above-mentioned control means.

Subsequently, the plurality of states φ1 to φ6 of the H bridge circuit 206 are described. In the present embodiment, the state controller 204a controls the H bridge circuit 206 in the following sequence.

(i) First conducting state φ1
MH1=ON, ML1=OFF, MH2=OFF, ML2=ON
OUT1=$V_{DD}$, OUT2=$V_{SS}$ (ii) First PWM (Pulse Width Modulation) conducting state φ2
MH1=ON/OFF switch, ML1=OFF, MH2=OFF, ML2=ON (iii) First regenerating state φ3
MH1=OFF, ML1=OFF, MH2=OFF, ML2=ON
OUT1=HiZ (high_impedance state), OUT2=$V_{SS}$ (iv) Second regenerating state φ4
MH1=OFF, ML1=ON, MH2=OFF, ML2=OFF
OUT1=$V_{SS}$, OUT2=HiZ (v) Second PWM conducting state ϕ5
MH1=OFF, ML1=ON, MH2=ON/OFF switch, ML2=OFF
(vi) Second conducting state ϕ6
MH1=OFF, ML1=ON, MH2=ON, ML2=OFF
OUT1=$V_{SS}$, OUT2=$V_{DD}$
(vii) Third PWM conducting state ϕ7
MH1=OFF, ML1=ON, MH2=ON/OFF switch, ML2=OFF
(viii) Third regenerating state ϕ8
MH1=OFF, ML1=ON, MH2=OFF, ML2=OFF
OUT1=$V_{SS}$, OUT2=HiZ
(ix) Fourth regenerating state ϕ9
MH1=OFF, ML1=OFF, MH2=OFF, ML2=ON
OUT1=HiZ (high_impedance state), OUT2=$V_{SS}$
(x) Fourth PWM conducting state ϕ10
MH1=ON/OFF switch, ML1=OFF, MH2=OFF, ML2=ON The structure composition of the motor driving device 200 has been laid out above, and the operation thereof is provided next.

To articulate the advantages of the present motor driving device 200, the operation of the prior motor driving device that does not comprise the present compulsory regenerating circuit 210 and the present current monitoring circuit 208 is discussed first.

FIGS. 4A to 4F are state transition diagrams of the H bridge circuit 206 of the motor driving device in the prior art. FIGS. 5A and 5B are operation waveform diagrams of the motor driving device in the prior art. The phase relation between the coil current $I_L$ and driving voltage waveform $V_{OUT}$ (=$V_{OUT1}$−$V_{OUT2}$) varies depending on factors such as the position of the Hall element 104, the type or performance of the single-phase motor 102, the level of the source voltage $V_{DD}$, load of the single-phase motor 102, etc.

In FIG. 5A, the phase of the coil current $I_L$ advances in relation to the driving voltage waveform $V_{OUT}$. Focus on the first regenerating state ϕ3 of the FIG. 5A. When there is no phase delay of the coil current $I_L$, during the period of the first regenerating state ϕ3 before the zero crossing point (t0), the coil current $I_L$ becomes zero; then, the direction (polarity) of the current reverses. As a consequence, in the next second regenerating state ϕ4, the coil current $I_L$ flows in the direction from the second output OUT2 via the motor coil 103 and toward the first output OUT1. In this state, as illustrated in FIG. 4D, the regenerating current flows in the path 114 comprising the ground line 222, the body diode DL2 of the low-voltage side transistor ML2, the motor coil 103, and the low-voltage side transistor ML1, thereby avoiding the occurrence of the voltage jump of the voltage.

Figure 6B:
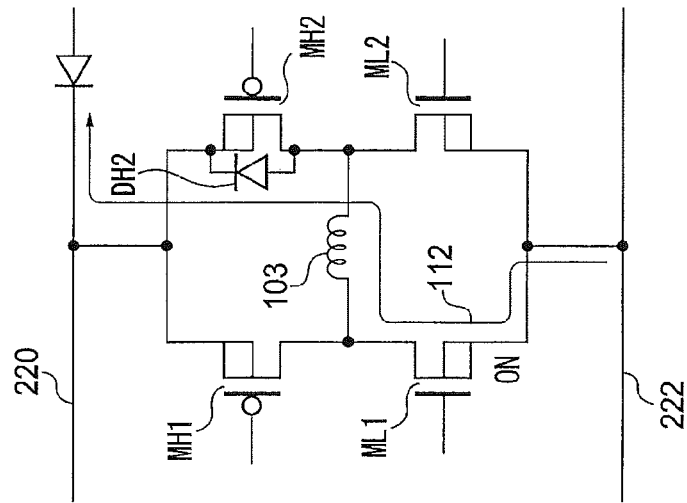
FIG. 6B is a diagram illustrating the second regenerating state in the prior art.

Next, referring to FIG. 5B, the voltage jump of the voltage of interest is discussed. In FIG. 5B, the phase of the coil current $I_L$ is delayed in relation to the driving voltage waveform $V_{OUT}$. If the phase of the coil current $I_L$ is delayed, after the zero crossing point (t1), the coil current $I_L$ becomes zero. That is, during the second regenerating state ϕ4, there is also the coil current $I_L$ that flows in the direction from the second output OUT2 via the motor coil 103 and toward the first output OUT1. In this state, as illustrated in FIG. 6B, the regenerating current flows from the ground line 222 via the path 112 comprising the low-voltage side transistor ML1, the motor coil 103, and the body diode DH2 of the high-voltage side transistor MH2, and toward the power source, and hence, the voltage $V_{OUT}2$ jumps more significantly than the source voltage $V_{DD}$ does.

Subsequently, the operation of the motor driving device according to embodiments of the present disclosure 200 is discussed.

Figure 6A:
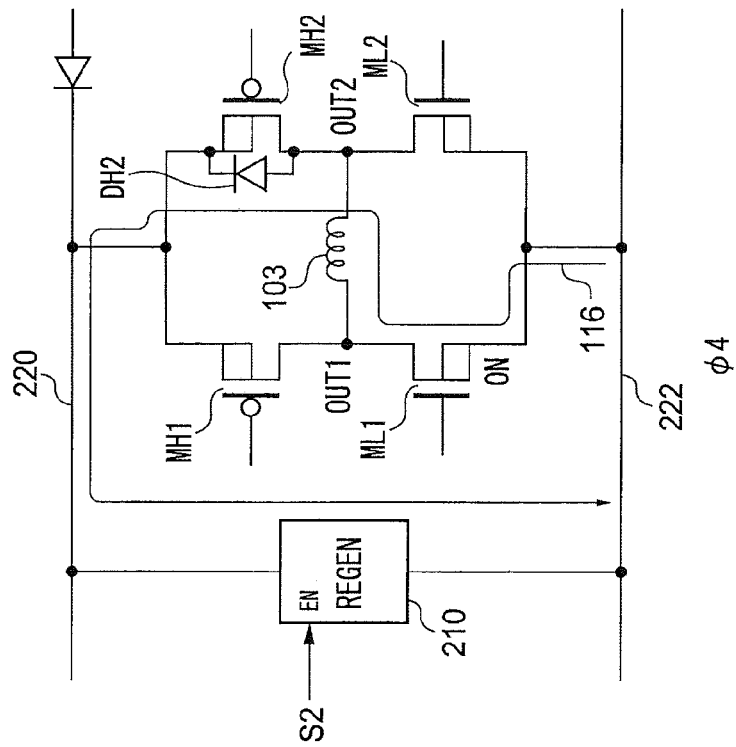
FIG. 6A is a diagram illustrating the second regenerating state of the motor driving device according to embodiments of the present disclosure.
Figure 7:
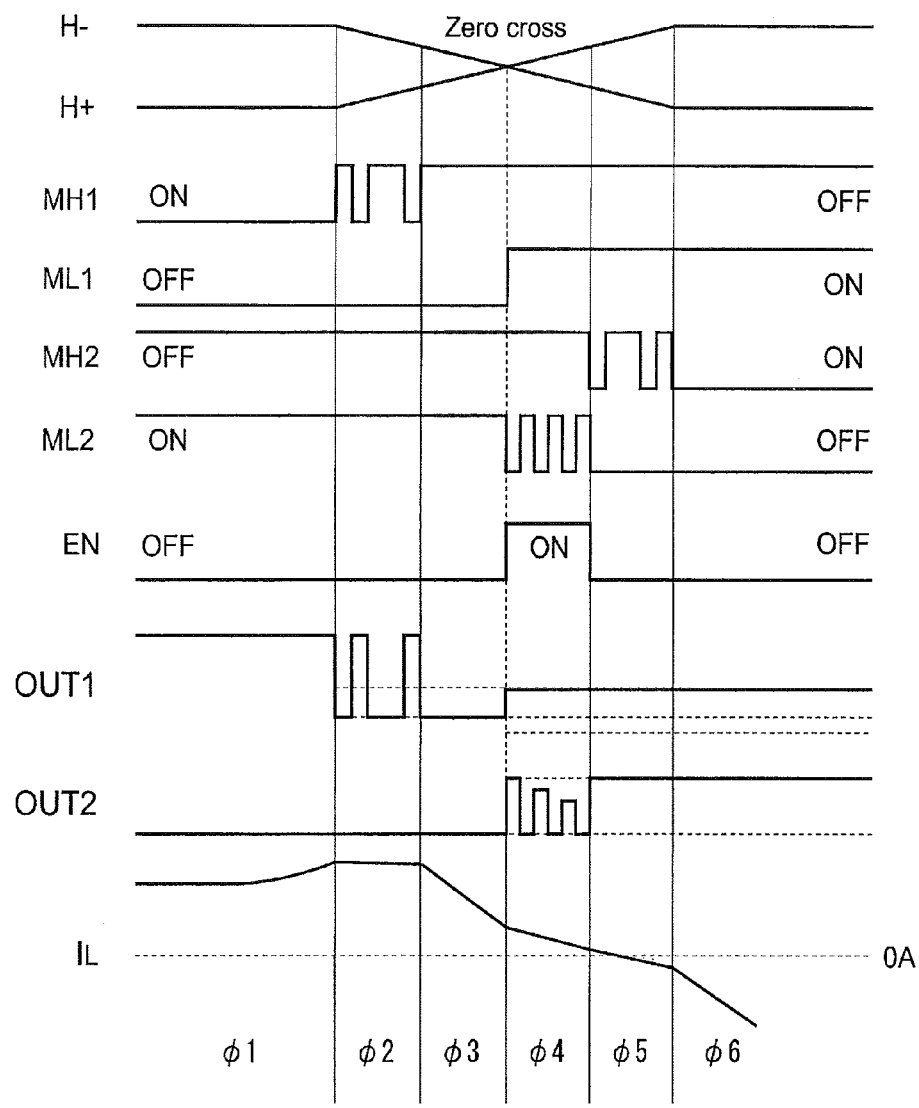
FIG. 7 is an operation waveform diagram of the motor driving device according to embodiments of the present disclosure.

FIG. 6A is a diagram illustrating the second regenerating state ϕ4 of the motor driving device 200 according to embodiments of the present disclosure; FIG. 6B, is a diagram illustrating the second regenerating state ϕ4 in the prior art. FIG. 7 is an operation waveform diagram of the motor driving device 200 according to embodiments of the present disclosure. State ϕ1 to ϕ3 are the same as those illustrated in FIG. 5B.

If the zero crossing occurs at time t1, which is used as the turning point, and the motor driving device 200 is shifted from the first regenerating state ϕ3 into the second regenerating state ϕ4. In the case where the phase of the coil current is delayed, during the second regenerating state ϕ4, the coil current $I_L$ flows from OUT1 toward OUT2, as illustrated in FIG. 6A.

If the regenerating controller 204b detects such state, the enabling signal S2 is asserted to enable the compulsory regenerating circuit 210. In this way, as illustrated in FIG. 6A, from the ground line 222, a path 116 comprising the transistor ML1, the motor coil 103, the body diode DH2 of the transistor MH2, the power line 220, and the compulsory regenerating circuit 210 is formed, and the compulsory regenerating current flows in said path 116. In this way, it is feasible to inhibit the voltage jump of the output voltage $V_{OUT}2$ or the source voltage $V_{DD}$.

The operation of the motor driving device 200 has been discussed above.

Accordingly, the motor driving device 200 according to embodiments of the present disclosure may allow the current that is originally intended to flow from the protective diode 212 into the power source to return to the ground line 222 via the compulsory regenerating circuit 210, thereby inhibiting the voltage jump of the source voltage $V_{DD}$ or the output voltage $V_{OUT}2$.

Figure 1:
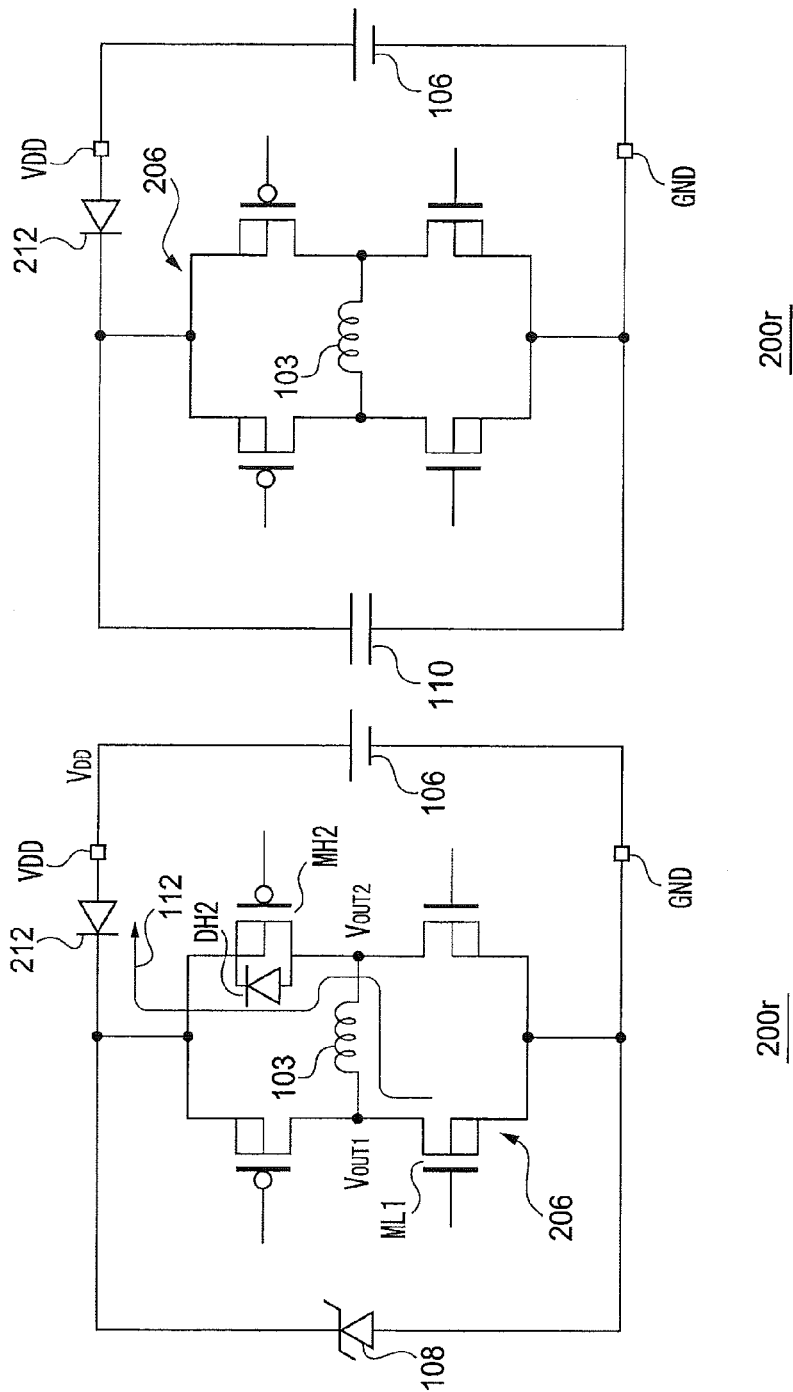
FIGS. 1A and 1B provide circuit diagrams of a fan motor driving device.

Further, as illustrated in FIGS. 3A and 3B, since the compulsory regenerating circuit 210 may be configured as the combination of the transistor and resistor (or diode), it is more readily to be integrated in the motor driving device 200. Accordingly, while integrating these elements, as compared with the case where the Zener diode 108 or the capacitor 110 in FIG. 1 are installed externally to the driving device 200, it is possible to reduce the area and the cost of the circuit.

The present invention involves various circuits illustrated in the block diagram of FIG. 2, and the examples of theses circuits are described below in more detail.

Figure 8:
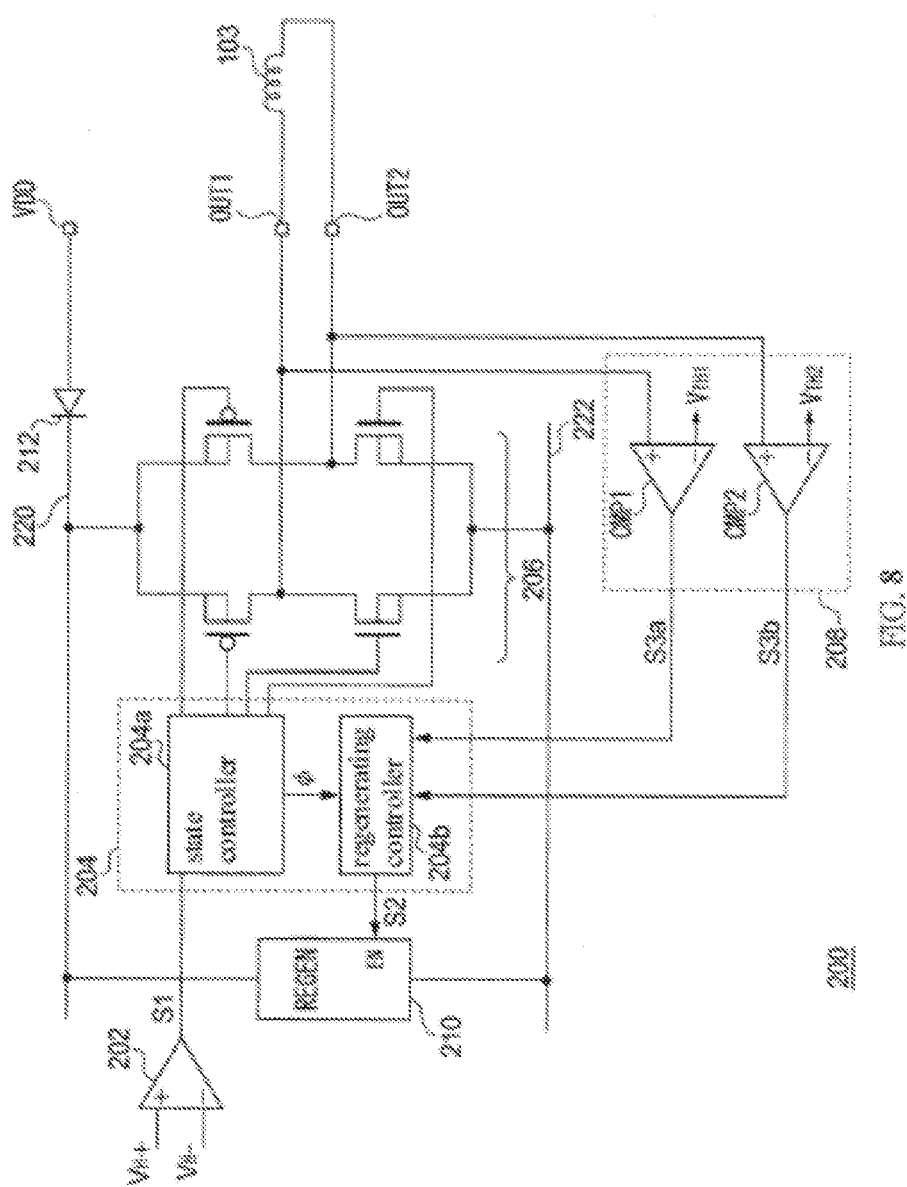
FIG. 8 is a circuit diagram of a motor driving device according to example of the present disclosure.

FIG. 8 is the circuit diagram of the motor driving device 200 according to one example.

The current monitoring circuit 208 comprises a first comparator CMP1 and a second comparator CMP2. The first comparator CMP1 is configured to detect the direction of the coil current $I_L$ immediately after the transition to the second regenerating state ϕ4.

As illustrated in FIG. 5A, the phase of the coil current $I_L$ advances, before the zero crossing point t0 and when the coil current $I_L$ becomes zero, immediately after the transition to the second regenerating state ϕ4, the voltage $V_{OUT1}$ of the first output OUT1 becomes higher than the ground voltage ($V_{SS}$=0 V). On the other hand, if the phase of the coil current $I_L$ delays, then, as illustrated in FIG. 5B, during the second regenerating state ϕ4, the voltage $V_{OUT1}$ of the first output OUT1 becomes −$R_{ON}$×IL, which is a negative voltage (<0 V). $R_{ON}$ is the ON resistance of the transistor ML1. That is, by monitoring the voltage $V_{OUT1}$ of the first output OUT1, it is feasible to detect the direction of the current in the second regenerating state φ4, and therefore, the first comparator CMP1 is employed.

The first comparator CMP1 is configured to compare the voltage $V_{OUT1}$ of the first output OUT1 and a first threshold voltage $V_{TH1}$. The logic circuit 204 (regenerating controller 204b) controls (enables) the compulsory regenerating circuit 210 based on the output of the first comparator CMP1.

The first threshold voltage $V_{TH1}$ is set as the ground voltage $V_{SS}$ or a neighboring value. The output S3a of the first comparator CMP1 indicates the comparison result between the $V_{OUT1}$ an the $V_{TH1}$. The regenerating controller 204b, and the $T_{H1}$. V while being in the second regenerating state φ4 during the transition from the first conducting state φ1 to the second conducting state φ6, the enabling signal S2 is asserted when the voltage $V_{OUT1}$ of the first output OUT1 is lower than the first threshold voltage $V_{TH1}$, thereby enabling the compulsory regenerating circuit 210.

In FIG. 8, when the compulsory regenerating circuit 210 is in the first state φ4, and when the concern regarding the voltage jump no longer exists, the compulsory regenerating circuit 210 is disabled. Specifically, (i) the regenerating controller 204b monitors the coil current $I_L$, and when the current $I_L$ flowing in the direction from the first output OUT1 via the motor coil 103 and toward the second output OUT2 substantially becomes zero, or is sufficiently low, the compulsory regenerating circuit 210 is disabled.

The second comparator CMP2 is configured to detect the coil current $I_L$ of the compulsory regenerating. While being in the second regenerating state φ4, and when the current flows in the path 116 of the FIG. 6A, the voltage of the second output OUT2 reduces as the source voltage $V_{DD}$ decreases concurrent to the decrease in the coil current $I_L$. The second comparator CMP2 compares the voltage $V_{OUT2}$ of the second output OUT2 with a second threshold voltage $V_{TH2}$. The regenerating controller 204b controls (disables) the compulsory regenerating circuit 210 based on the output S3b of the second comparator CMP2. The second threshold voltage $V_{TH2}$ is set as a value between the ground voltage $V_{SS}$ and the source voltage $V_{DD}$. For example, the second threshold voltage $V_{TH2}$ may be the average voltage $(V_{DD}+V_{SS})/2$ of the two; Optionally, a neighboring value thereof. If the voltage of the second output OUT2 is lower than the second threshold voltage $V_{TH2}$, that is, the coil current $I_L$ becomes too small for the voltage jump to occur, the regenerating controller 204b disables the compulsory regenerating circuit 210.

Also, the state controller 204a of the logic circuit 204 allows the second output OUT2 to be switched between the high_impedance state HiZ and the ground voltage $V_{SS}$, when the compulsory regenerating circuit 210 is in the period of the enabled state. For example, the state controller 204a allows the second output OUT2 to be switched between the high_impedance state HiZ and the ground voltage $V_{SS}$ in a time ratio of 7:3.

During the period in which the second output OUT2 is in the high_impedance state HiZ, it is feasible to use the compulsory regenerating circuit 210 to consume the energy of the motor coil. Also, by incorporating a period in which the second output OUT2 is set as the ground voltage $V_{SS}$, it may further inhibit the voltage jump, as compared with keeping the second output OUT2 in the high_impedance state. Furthermore, the balance between the power consumed by the compulsory regenerating circuit 210 and the jump level of the voltage can be adjusted based on the duty ratio (time ratio) of the switching.

According to the above-mentioned example, it is feasible to optimally control the enable and disable of the compulsory regenerating circuit 210 based on the coil current $I_L$.

The present invention has been discussed with a certain degree of particularity based on embodiments thereof. These embodiments are only provided for the illustrative purpose, and persons having ordinary skill in the art may anticipate that many variant examples may be contemplated by combinations of the elements or processing steps without departing from the spirit or scope of this invention. Some of these variant examples are discussed below.

First Variant Example

In the above-mentioned embodiments, during the transition from the first conducting state φ1 to the second conducting state φ6, the inhibition of the voltage jump of the voltage $V_{OUT}2$ and the source voltage $V_{DD}$ in the first state (second regenerating state φ4) in which the first output OUT1 is the ground voltage and the second output OUT2 is in the high_impedance state has been provided.

Similarly, during the process of returning to the first conducting state φ1 from the second conducting state φ6, in the second state (fourth regenerating state φ9) in which the second output OUT2 is the ground voltage and the first output OUT1 is in the high_impedance state, it is also possible that the voltage jump of the voltage $V_{OUT}1$ and the source voltage $V_{DD}$ may occur.

According to the first variant example, the motor driving device 200a enables the compulsory regenerating circuit 210, when the motor driving device 200a is in the fourth regenerating state φ9, and when the coil current $I_L$ intends to flow from the second output OUT2 toward the first output OUT1, so as to inhibit the voltage jump of these voltages.

Figure 9:
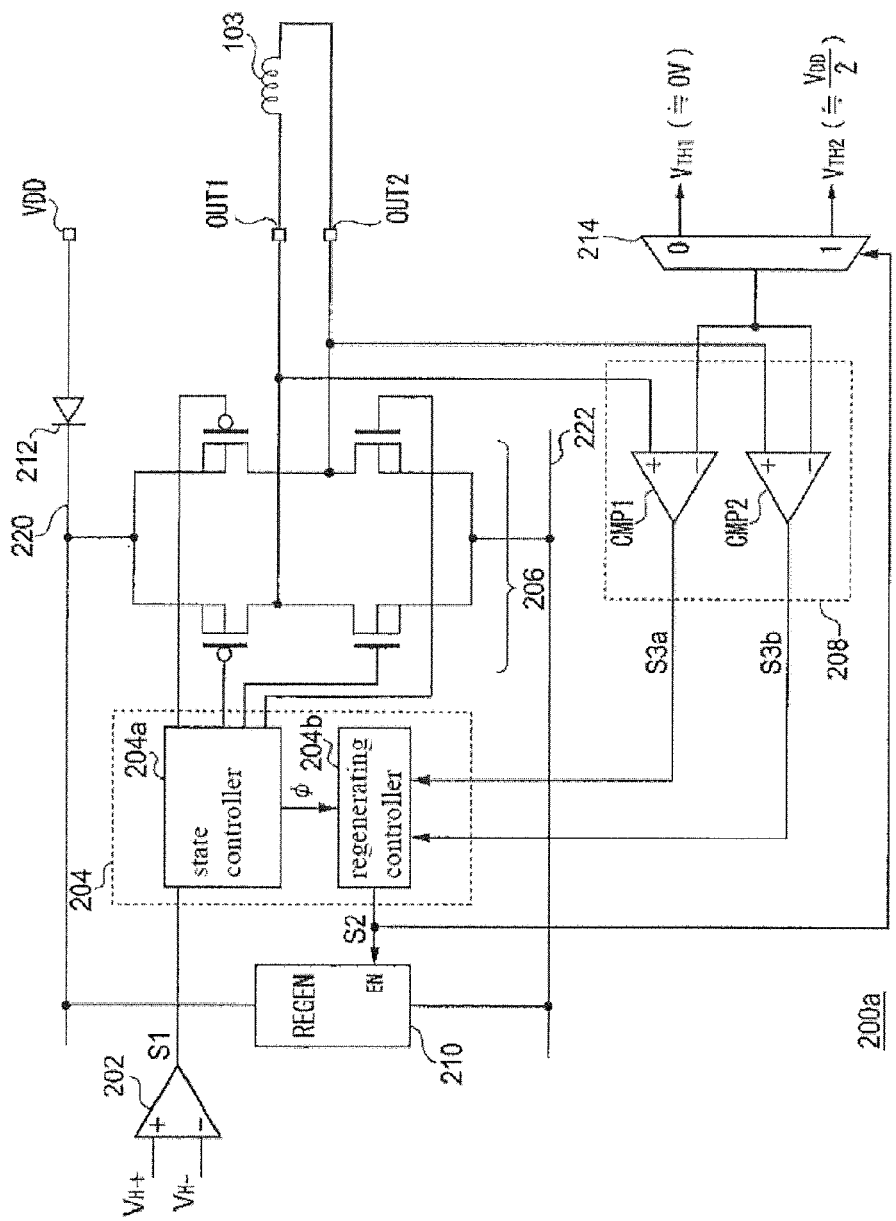
FIG. 9 is a circuit diagram of a motor driving device according to a first variant example.

FIG. 9 is a circuit diagram of the motor driving device 200a according to the first variant example. The motor driving device 200a, in addition to comprising the motor driving device 200 of FIG. 8, further comprises a selector (analog multiplexer) 214. The selector 214 selects the first threshold voltage $V_{TH1}$, when the enabling signal S2 is in the low level (0) (i.e., the compulsory regenerating circuit 210 is in the disabled state); and selects second threshold voltage $V_{TH2}$, when the enabling signal S2 is in the high level (1) (i.e., the compulsory regenerating circuit 210 is in the enabled state).

In this way, by using two comparators CMP1, CMP2, it is feasible to control the state of the compulsory regenerating circuit 210 in both the regenerating states φ3 and φ4.

Second Variant Example

The control sequence of the H bridge circuit 206 is not limited to the order provided in FIG. 4.

In the above-mentioned embodiments, while being in the PWM conducting state φ2, switch the high-voltage side transistor MH1; while being in the PWM conducting state φ5, switch the high-voltage side transistor MH2; however, the present invention is not limited thereto.

FIGS. 10A to 10F provide state transition diagrams of the H bridge circuit 206 of the motor driving device according to the second variant example. In the variant example, while being in the PWM conducting states φ2', φ5' of FIGS. 10B and 10E, switch the low-voltage side transistors ML1, ML2. Further, while being in the first regenerating state φ3' of FIG. 10C, the transistor MH2 is switched on while the others are switched off; the first output OUT1 becomes in the high_impedance state, and the second output OUT2 becomes in the source voltage $V_{DD}$. While being in the second regenerating state ϕ4' of FIG. 10D, the transistor MH1 is switched on while the others are switched off; the first output OUT1 becomes the source voltage $V_{DD}$ and the second output OUT2 becomes in the high_impedance state. (i) Indicating the current path in the case when the phase the current is delayed, (ii) indicating the current path in the case where the phase of the current is advanced. During the process of returning to the first conducting state ϕ1' from the second conducting state ϕ6', states ϕ7', ϕ8', ϕ9', and ϕ10' proceeds in the reversed order.

During the transition from the first conducting state ϕ1' to the second conducting state ϕ6', exists a third state (second regenerating state ϕ4') in which the first output OUT1 is the source voltage $V_{DD}$ and the second output OUT2 is in the high_impedance state. When the regenerating controller 204b is in the second regenerating state ϕ4', and when the motor coil 103 has the coil current $I_L$ flowing in the direction from the second output OUT2 toward the first output OUT1, the regenerating controller 204b enables the compulsory regenerating circuit 210.

During the transition from the second conducting state ϕ6' to the first conducting state ϕ1', exists a fourth state (fourth regenerating state ϕ9') in which the second output OUT2 is the source voltage $V_{DD}$ and the first output OUT1 is in the high-impedance state. When the regenerating controller 204b is in the fourth regenerating state ϕ9', and when the motor coil 103 has the coil current $I_L$ flowing in the direction from the first output OUT1 toward the second output OUT2, the regenerating controller 204b enables the compulsory regenerating circuit 210.

According to the variant example, performing the PWM sequence control at the side of the high-voltage side may also inhibit the voltage jump of the voltage.

Alternatively, for the control sequence of the H bridge circuit 206, the PWM conducting states ϕ2, ϕ5, ϕ7, and ϕ10 may be omitted. Also, while being in the PWM conducting states ϕ2, ϕ5, ϕ7, and ϕ10, it is also feasible to switch the pair of elements that are diagonally disposed.

Third Variant Example

Figure 11A:
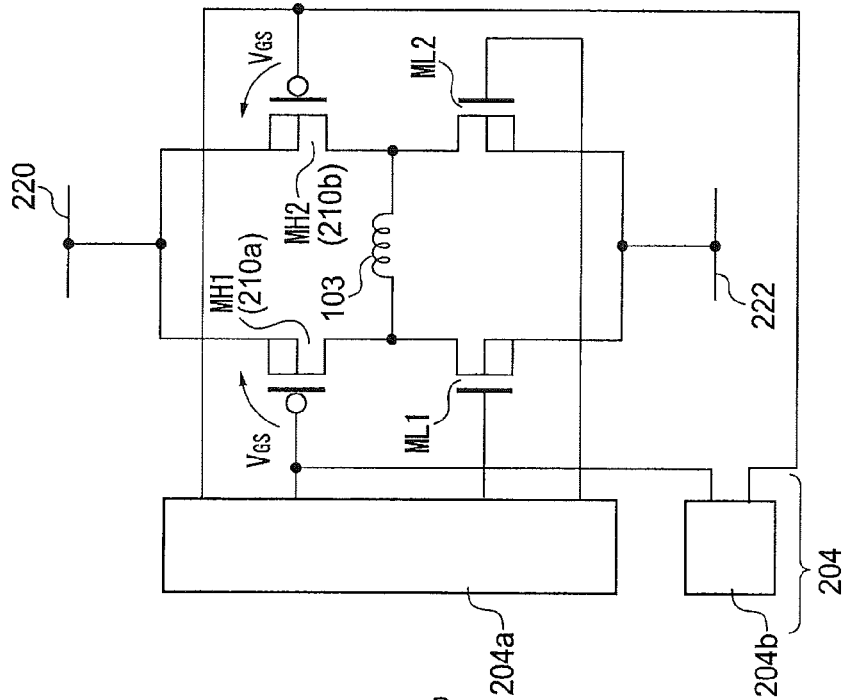
FIGS. 11A and 11B provide circuit diagrams of the compulsory regenerating circuit according to variant examples.
Figure 11B:
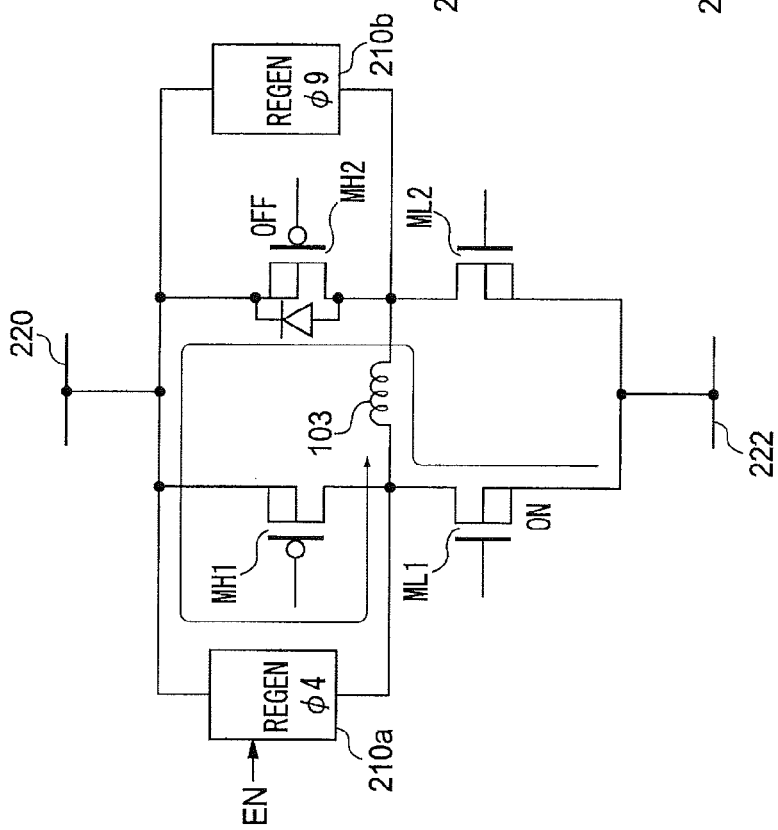

In the third variant example, the compulsory regenerating circuit 210 is configured to: while being in the enabled state, allow the current that flows from the ground line 222 via the H bridge circuit 206 and the motor coil 103 and toward the power line 220 to back-flow to one end of the motor coil 103, instead of back-flowing to the ground line 222. FIGS. 11A and 11B provide circuit diagrams of the compulsory regenerating circuit 210 according to variant examples. The compulsory regenerating circuit 210a, while being in the first state ϕ4, back-flows to one end (OUT1) of the motor coil 103. The compulsory regenerating circuit 210b, while being in the second state ϕ9, back-flows to another end (OUT2) of the motor coil 103.

According to the configuration illustrated in FIG. 11B, the high-voltage side transistors MH1, MH2 are also used as the compulsory regenerating circuit 210. In FIG. 11A, the enabled state of the compulsory regenerating circuit 210a corresponds to a state in which the high-voltage side transistor MH1 is weakly conducted. Further, FIG. 11B, the enabled state of the compulsory regenerating circuit 210b corresponds to a state in which the high-voltage side transistor MH2 is weakly conducted. The regenerating controller 204b, while the compulsory regenerating circuit 210a is enabled, sets the gate-to-source voltage $V_{GS}$ of the transistor MH1 to a suitable level, and sets the ON resistance to a preferred level. Further, the regenerating controller 204b, while the compulsory regenerating circuit 210b is enabled, sets the gate-to-source voltage $V_{GS}$ of the transistor MH2 to a suitable level, and sets the ON resistance to a preferred level.

Figure 12:
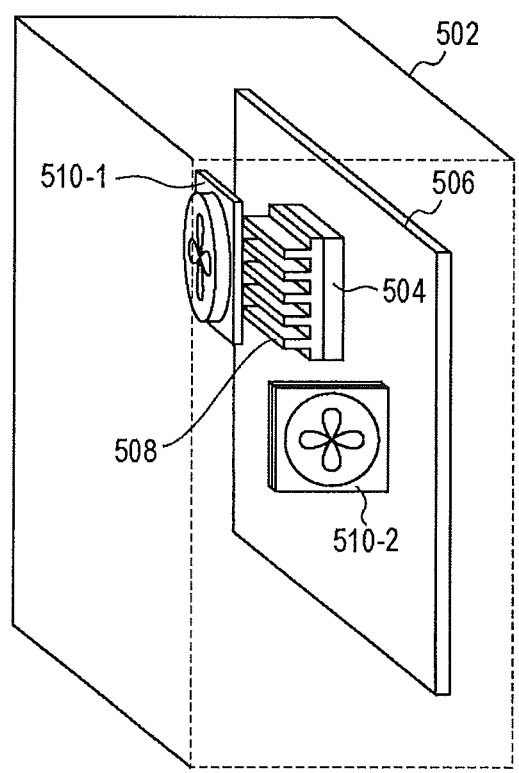
FIG. 12 is a perspective view illustrating a computer comprising the present cooling device.

Last, the application of the motor driving device 200 is discussed. FIG. 12 is a perspective view illustrating a computer comprising the present cooling device 510. The cooling device 510 comprises a fan motor for use as a single-phase motor 102, and the motor driving device 200 illustrated in FIG. 2. The computer 500 comprises a casing 502, a CPU 504, a motherboard 506, a heat sink 508, and a plurality of cooling device 510.

The CPU 504 is installed on the 506. The heat sink 508 is tightly connected to the upper surface of the CPU 504. The cooling device 510_1 is disposed opposite to the heat sink 508, and configured to blow air onto the heat sink 508. The cooling device 510_2 is disposed on the back of the casing 502, and configured to bring the ambient air inside the casing 502.

The cooling device 2, in addition to be installed in the computer 500 illustrated in FIG. 12, may also be installed in various electronic equipments such as workstations, laptops, televisions, refrigerators, etc.

Further, the applications of the driving device 2 according to present embodiments are not limited to the driving of the fan motor; rather, it could be used to drive any other types of motor.

The present invention has been discussed with a certain degree of particularity based on embodiments thereof; however, these embodiments only disclose the principles of the present invention, and the applications of these embodiments allow for various variations or alterations of the configuration without departing from the spirit or scope of this invention as defined by the appended claims.

What is claimed is:

1. A motor driving device, characterized for driving a single-phase motor and comprising:
   an H bridge circuit, configured to receive a source voltage and a ground voltage, and couple to a motor coil of the single-phase motor between a first output and a second output thereof;
   a logic circuit, configured to allow the H bridge circuit to be shifted among a plurality of states in a specific sequence; and
   a compulsory regenerating circuit, configured to be switched between an enabled state and a disabled state, and while being in the enabled state, allow a current flowing from a ground line via the H bridge circuit and the motor coil to a power line to back-flow to the ground line.

2. The motor driving device of claim 1, wherein the plurality of states comprise a first state in which the first output is the ground voltage and the second output is in a high_impedance state, and
   the logic circuit enables the compulsory regenerating circuit, when the logic circuit is in the first state, and when the motor coil has a coil current flowing in a direction from the first output toward the second output.

3. The motor driving device of claim 2, wherein the logic circuit allows the second output to be switched between the high_impedance state and the ground voltage, during a period in which the compulsory regenerating circuit is in the enabled state.

4. The motor driving device of claim 2, wherein the plurality of state further comprises a second state in which the second output is the ground voltage and the first output is in the high_impedance state, and the logic circuit enables the compulsory regenerating circuit, when the logic circuit is in the second state, and when the motor coil has the coil current flowing in a direction from the second output toward the first output.

5. The motor driving device of claim 1, wherein the plurality of state comprises a third state in which the first output is the source voltage and the second output is in the high_impedance state, and the logic circuit enables the compulsory regenerating circuit, when the logic circuit is in the third state, and when the motor coil has the coil current flowing in a direction from the second output toward the first output.

6. The motor driving device of claim 5, wherein the plurality of state comprises a fourth state in which the second output is the source voltage and the first output is in the high_impedance state, and the logic circuit enables the compulsory regenerating circuit, when the logic circuit is in the fourth state, and when the motor coil has the coil current flowing in a direction from the first output toward the second output.

7. The motor driving device of claim 1, further comprising a current monitoring circuit, wherein the current monitoring circuit detects the direction or phase of the coil current flowing in the motor coil, and the logic circuit controls the compulsory regenerating circuit based on the output of the current monitoring circuit.

8. The motor driving device of claim 7, wherein the current monitoring circuit comprises a first comparator for comparing the voltage of the first output and a first threshold voltage, and the logic circuit controls the compulsory regenerating circuit based on the output of the first comparator.

9. The motor driving device of claim 8, wherein the first threshold voltage is set as the ground voltage or a neighboring value, and the logic circuit enables the compulsory regenerating circuit, when the voltage of the first output is lower than the first threshold voltage.

10. The motor driving device of claim 8, wherein the current monitoring circuit further comprises a second comparator for comparing the voltage of the second output and a second threshold voltage, and the logic circuit controls the compulsory regenerating circuit based on the output of the second comparator.

11. The motor driving device of claim 10, wherein the second threshold voltage is set as a value between the ground voltage and the source voltage, and the logic circuit disables the compulsory regenerating circuit when the voltage of the second output is lower than the second threshold voltage.

12. The motor driving device of claim 11, wherein the second threshold voltage is set as the substantial average of the ground voltage and the source voltage.

13. The motor driving device of claim 1, wherein the logic circuit disables the compulsory regenerating circuit, when the compulsory regenerating circuit is in the enabled state period, and when the coil current flowing in the motor coil is reduced to a specific amount.

14. The motor driving device of claim 1, wherein the logic circuit disables the compulsory regenerating circuit, after a specific period following the compulsory regenerating circuit is switched into the enabled state.

15. The motor driving device of claim 1, wherein the compulsory regenerating circuit comprises a transistor disposed between the power line and the ground line.

16. The motor driving device of claim 15, wherein the compulsory regenerating circuit comprises a resistor that is disposed between the power line and the ground line and in series connection with the transistor.

17. The motor driving device of claim 15, wherein the compulsory regenerating circuit comprises a diode disposed between the power line and the ground line and in series connection with the transistor.

18. The motor driving device of claim 1, wherein the logic circuit is sequentially shifted into at least the following states:
   (i) a first conducting state, in which the first output is set as the source voltage, and the second output is set as the ground voltage;
   (ii) a first regenerating state, in which the first output is set as the high_impedance state, and the second output is set as the ground voltage;
   (iii) a second regenerating state, in which the first output is set as the ground voltage, and the second output is set as the high_impedance state;
   (iv) a second conducting state, in which the first output is set as the ground voltage, and the second output is set as the source voltage;
   (v) a third regenerating state, in which the first output is set as the high_impedance state, and the second output is set as the ground voltage; and
   (vi) a fourth regenerating state, in which the first output is set as the ground voltage, and the second output is set as the high_impedance state; wherein
   the logic circuit (a) enables the compulsory regenerating circuit, when the logic circuit is in the second regenerating state and has a current flowing in a direction from the first output via the motor coil and toward the second output, (b) enables the compulsory regenerating circuit, when the logic circuit is in the fourth regenerating state and has a current flowing in a direction from the second output via the motor coil and toward the first output.

19. The motor driving device of claim 1, wherein the impedance of the compulsory regenerating circuit in the enabled state is higher than a resistance of a current path of the H bridge circuit.

20. The motor driving device of claim 1, wherein when the compulsory regenerating circuit is in the enabled state, the compulsory regenerating circuit is configured to: allow the current flowing from the ground line via the H bridge circuit and the motor coil to the power line to back-flow to one end of the motor coil, instead of back-flowing to the ground line.

21. The motor driving device of claim 1, wherein the motor driving device is integrated on a semiconductor substrate as a whole.

22. A cooling device, characterized in comprising:
   a fan motor;
   a Hall element, configured to generate a pair of Hall signals indicating the position of the rotor of the fan motor; and
   the fan motor driving device of claim 1, configured to drive the fan motor based on the pair of Hall signals.

23. An electronic equipment, characterized in comprising:
a processor;
a fan motor, disposed opposite to the processor;
a Hall element, configured to generate a pair of Hall signals indicating the position of the rotor of the fan motor; and
the fan motor driving device of claim 1, configured to drive the fan motor based on the pair of Hall signals.

24. A motor driving device, characterized for driving a single-phase motor and comprising:
an H bridge circuit, configured to receive a source voltage and a ground voltage, and couple to the motor coil of the single-phase motor between a first output and a second output thereof;
a logic circuit, configured to control the H bridge circuit; and
a compulsory regenerating circuit, configured to be switched between an enabled state and a disabled state, and while being in the enabled state, allow a current flowing from the ground line via the H bridge circuit and the motor coil to a power line to back-flow to the ground line;
a first comparator, for comparing the voltage of the first output and a first threshold voltage; and
a second comparator, for comparing the voltage of the second output and a second threshold voltage; and
the logic circuit is configured to be sequentially shifted into at least the following states:
(i) a first conducting state, in which the first output is set as the source voltage, and the second output is set as the ground voltage;
(ii) a first regenerating state, in which the first output is set as the high_impedance state, and the second output is set as the ground voltage;
(iii) a second regenerating state, in which the first output is set as the ground voltage, and the second output is set as the high_impedance state;
(iv) a second conducting state, in which the first output is set as the ground voltage, and the second output is set as the source voltage;
(v) a third regenerating state, in which the first output is set as the ground voltage, and the second output is set as the high_impedance state; and
(vi) a fourth regenerating state, in which the first output is set as the high_impedance state, and the second output is set as the ground voltage; wherein
the compulsory regenerating circuit, (a) while being in the second regenerating state, becomes into the enabled state based on the output of the first comparator, and becomes into the disabled state based on the output of the second comparator, (b) while being in the fourth regenerating state, becomes into the enabled state based on the output of the second comparator, and becomes into the disabled state based on to output of the first comparator.

25. A motor driving method, characterized for driving a single-phase motor and comprising the steps of:
disposing an H bridge circuit, wherein the H bridge circuit receives a source voltage and a ground voltage, and couples to the motor coil of the single-phase motor between a first output and a second output thereof;
disposing a compulsory regenerating circuit, wherein the compulsory regenerating circuit is configured to be switched between an enabled state and a disabled state, and while being in the enabled state, allow a current flowing from the ground line via the H bridge circuit and the motor coil to a power line to back-flow to the ground line;
transiting, sequentially, into at least the following states: (i) a first conducting state, in which the first output is set as the source voltage, and the second output is set as the ground voltage; (ii) a first regenerating state, in which the first output is set as the high_impedance state, and the second output is set as the ground voltage; (iii) a second regenerating state, in which the first output is set as the ground voltage, and the second output is set as the high_impedance state, (iv) a second conducting state, in which the first output is set as the ground voltage, and the second output is set as the source voltage; (v) a third regenerating state, in which the first output is set as the ground voltage, and the second output is set as the high_impedance state; and (vi) a fourth regenerating state, in which the first output is set as the high_impedance state, and the second output is set as the ground voltage;
when being in the second regenerating state, and when the voltage of the first output is lower than a first threshold voltage, setting the compulsory regenerating circuit into the enabled state;
when being in the second regenerating state, and when the voltage of the second output is lower than a second threshold voltage, setting the compulsory regenerating circuit into the disabled state;
when being in the fourth regenerating state, and when the voltage of the second output is lower than the first threshold voltage, setting the compulsory regenerating circuit into the enabled state; and
when being in the second regenerating state, and when the voltage of the first output is lower than the second threshold voltage, setting the compulsory regenerating circuit into the disabled state.

* * * * *